United States Patent [19]

Gibbemeyer

[11] Patent Number: 4,498,859

[45] Date of Patent: Feb. 12, 1985

[54] CHUCK ACTIVATING APPARATUS

[75] Inventor: Joseph F. Gibbemeyer, Cincinnati, Ohio

[73] Assignee: Cincinnati Milacron Inc., Cincinnati, Ohio

[21] Appl. No.: 483,886

[22] Filed: Apr. 11, 1983

[51] Int. Cl.³ ............................................. B29D 23/03
[52] U.S. Cl. .................................... 425/534; 198/651; 198/653; 198/695; 264/535; 294/113; 425/541
[58] Field of Search ....................... 425/526, 534, 541; 264/535; 198/651, 653, 695; 294/113

[56] References Cited

U.S. PATENT DOCUMENTS 4,116,325  9/1978  McDonald ........................... 294/113
4,382,760  5/1983  Wiatt et al. ........................... 425/526

Primary Examiner—Jay H. Woo
Assistant Examiner—Timothy W. Heitbrink
Attorney, Agent, or Firm—Donald Dunn

[57] ABSTRACT

An apparatus is provided for activating a chuck in a blow molding machine to receive and releasably retain a thermoplastic polymer preform for blow molding a plastic container (e.g. bottle). The apparatus has a forked end reciprocatable sliding member whose forked end, in the chuck engaging position, moves vertically to activate the chuck to receive the preform. Several chucks may be activated simultaneously by the apparatus.

5 Claims, 4 Drawing Figures

CHUCK ACTIVATING APPARATUS

This invention relates to an apparatus for activating a chuck to receive and releasably retain a thermoplastic polymer workpiece in a blow molding machine for producing blow molded thermoplastic polymer containers. An aspect of this invention relates to an apparatus having a forked end slide which slidably engages a mechanism for activating a chuck to receive and releasably retain a thermoplastic polymer workpiece in a blow molding machine for producing blow molded thermoplastic polymer containers. Another aspect of this invention relates to an apparatus having a forked end slide for engaging a ring on a collect or chuck so as to activate the collet or chuck to receive and releasably retain a thermoplastic polymer preform.

BACKGROUND

Blow molding has become a commercially important process for producing thermoplastic polymer containers, such as for example, biaxially oriented bottles. There are essentially two principle processes presently used commercially to produce blow molded biaxially oriented containers (e.g. bottles). The first process involves producing a hot preform (usually by an injection or extrusion process), transferring the hot preform usually by means of a mandrel to a blow mold, blowing the container in a closed mold by injecting pressurized air into the hot preform to expand the preform axially and circumfrentially against the mold cavity, and then removing the biaxially oriented container from the opened mold. This process usually employs a preform producing apparatus that is integral with or attached to the blow molding apparatus. In the second process a previously produced cold or cooled preform is reheated to a blowing temperature or temperature profile, the heated preform inserted into the cavity of a blow mold, the mold closed about the preform, the preform extended axially and simultaneously or subsequently expanded circumferentially to conform to the mold cavity and then the biaxially oriented container removed from the opened mold. Preform production in the second process is performed on apparatus separated from and often located at a distance from the blow molding apparatus. This second process is known and often referred to as a reheat blow process. In the blow molding process for producing thermoplastic polymer containers there may be employed an injection molded preform workpiece or alternatively a preform workpiece that is an extruded tube which has been closed at one end and shaped into an open neck configuration, usually threaded, at the other end. These injection molded or shaped extruded tube preforms are often test tube shaped having a curved closed end and a threaded open neck end. Such preforms are usually grasped at the open neck end and carried through the steps of the reheat blow molding process by means of a carrier apparatus whereupon the blown container is then released from the carrying device.

There is in conjunction with this invention employed in the blow molding process for producing thermoplastic polymer containers a step of heating a previously formed preform which is transported through the heating step by means of the same carrier used to carry the preform through the various other steps of the process.

The high production rate of the blow molding apparatus for economically producing thermoplastic polymer containers (e.g. 1000-2000 containers/hr) requires the very rapid positive loading of the carriers with the preforms. Such high loading rates in turn require that the preform carriers be rapidly and reliably activated for receiving the preforms. Where such activation of the preform carrier is performed mechanically the device which activates the carriers must have reliable, fast, positive action and high durability. Heretofore, mechanical apparatus for activation of the preform carriers for grasping and releasably retaining the preforms, to be conveyed through the blow molding process, have not been entirely satisfactory and have been susceptible to frequent breakdowns, malfunctions and failure to properly activate the preform carrier to receive the preform. Such malfunctions and failures result in down time for the blow molding machine and the loss of preforms and containers.

It is an object of this invention to rapidly, positively and reliably activate preform carriers for receiving and releasably retaining preforms in a blow molding apparatus for producing thermoplastic polymer containers. Another object of this invention is to provide a rapidly, positively and reliably operating durable apparatus for activating preform carriers for receiving and releasably retaining thermoplastic polymer preforms in a blow molding machine. A further object of this invention is to provide a blow molding machine having preform carriers for receiving and releasably retaining thermoplastic polymer preforms and a durable apparatus for rapidly, positively and reliably activating the preform carriers to receive and releasably retain the preform.

Other objects and advantages of this invention will become apparent from the following description and the claims.

SUMMARY OF THE INVENTION

There is now provided in accordance with this invention in a machine, for blow molding a thermoplastic polymer container, having a chuck for receiving and releasably retaining a thermoplastic polymer article, an apparatus for activating the chuck comprising a) a frame and b) a forked end slide, movably mounted therein, for engaging the chuck. The forked end slide is moved in the frame from a nonengaging position to a chuck engaging position and returned to the non-engaging position and with the same chuck engaging motion or a separate motion of the slide activates the chuck to receive and releasably retain a thermoplastic polymer article.

DESCRIPTION OF THE INVENTION

Figure 2:
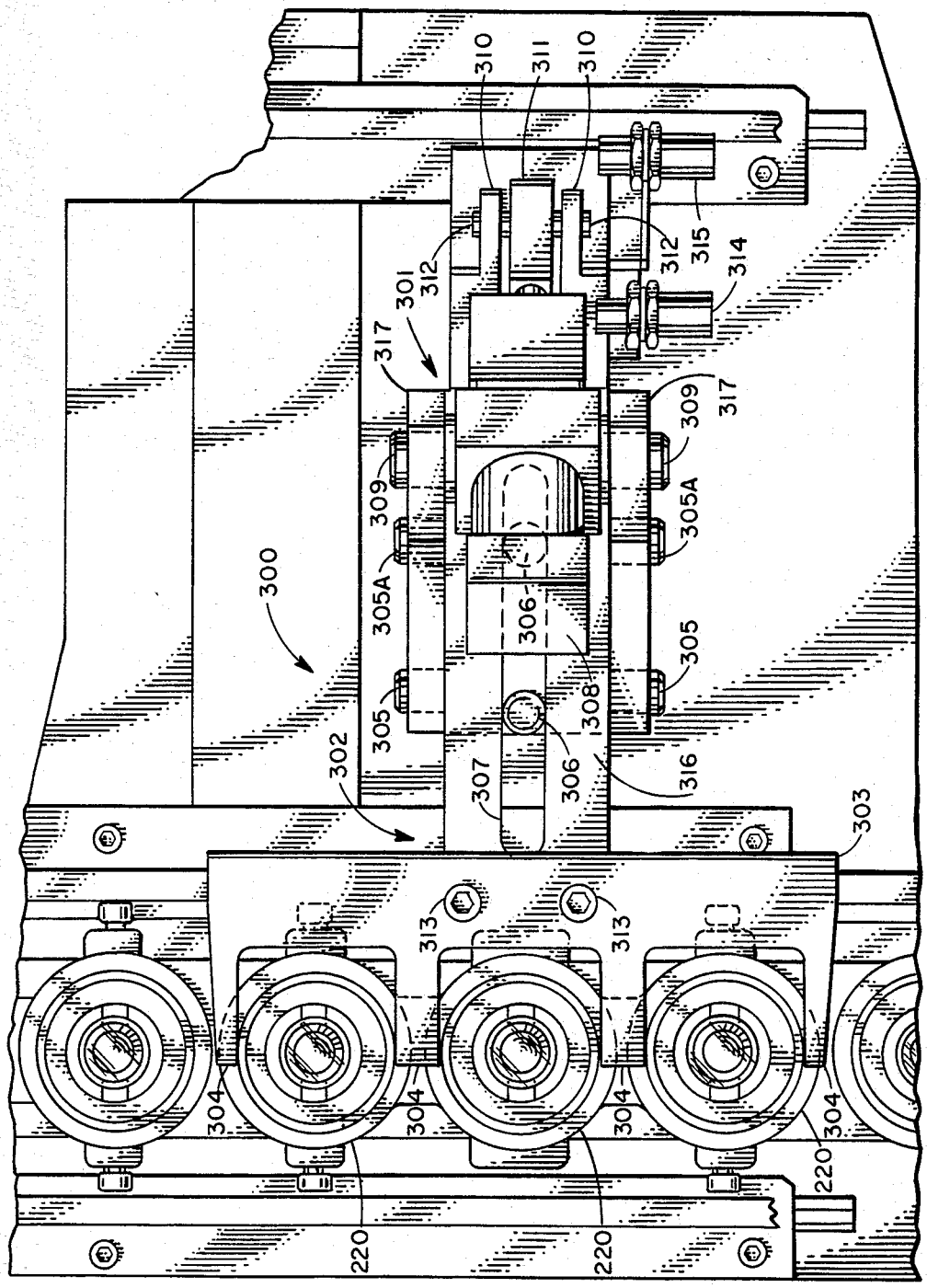
FIG. 2 is a plan top view of the chuck activating apparatus showing the forked end slide in the extended forward chuck engaging position.
Figure 3:
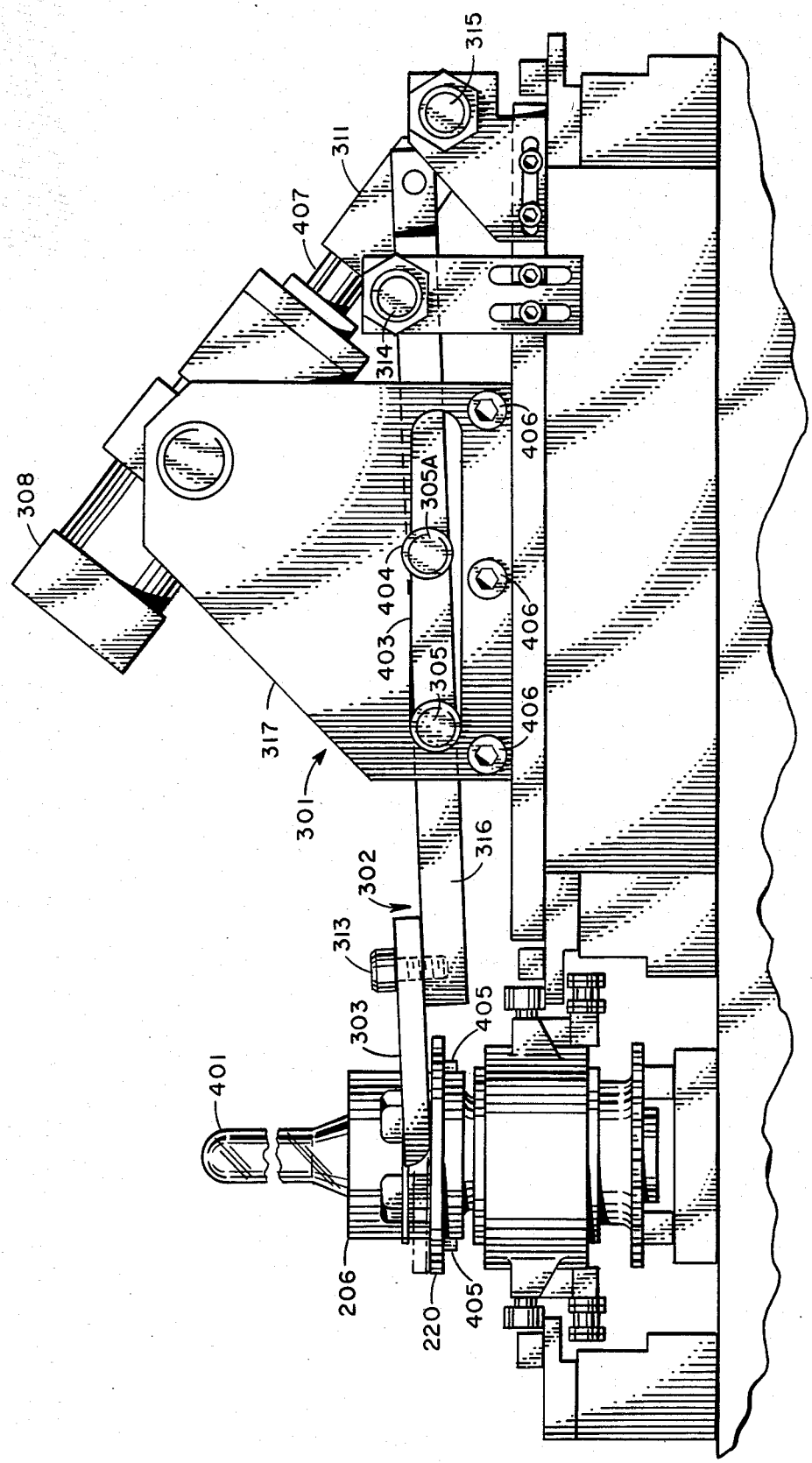
FIG. 3 is a side elevational view of the chuck activating apparatus showing the forked end slide in the extended forward activating position in engagement with the chuck.
Figure 4:
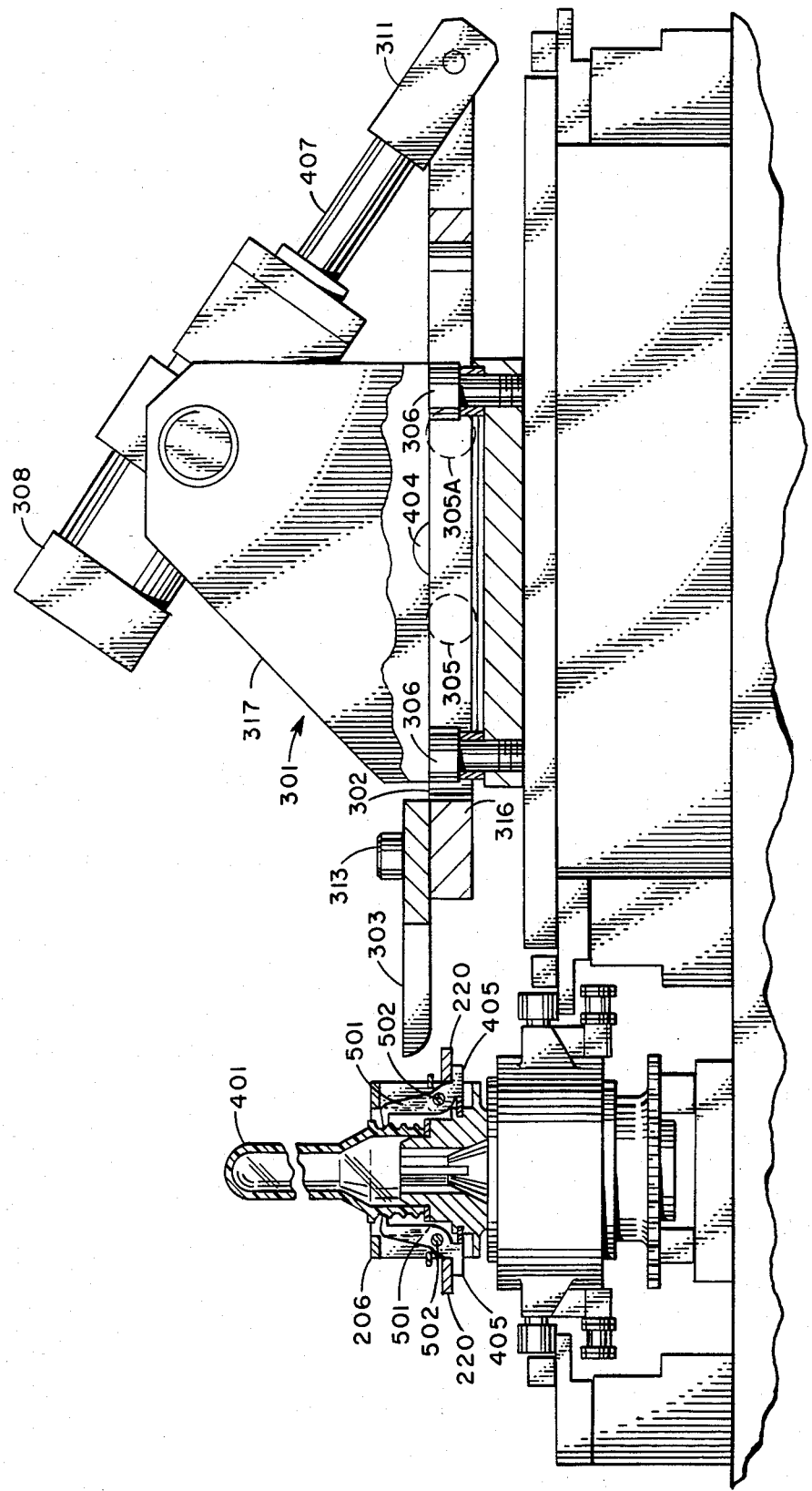
FIG. 4 is a partial sectional side elevational view of the chuck activating apparatus, a chuck and a preform in the chuck showing the slide in the retracted, rear, chuck non-engaging position.

This invention will now be further described in respect to a preferred embodiment with reference to FIGS. 2, 3 and 4.

Figure 1:
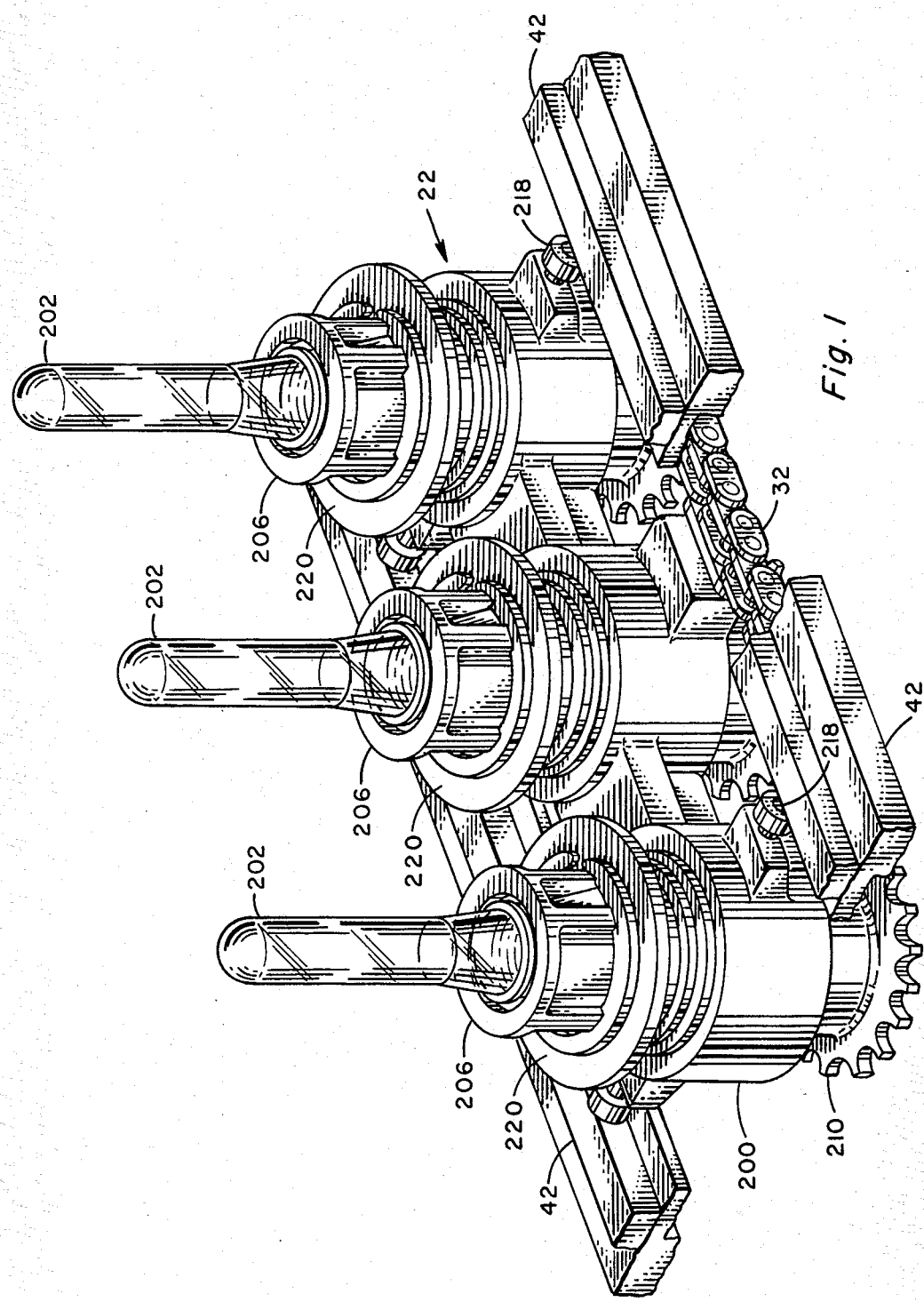
FIG. 1 is a fragmentary perspective view of a triple carrier assembly unit showing the chuck for releasably retaining a thermoplastic polymer preform, the carrier body, sprockets for causing rotation of the chuck, transporting chain drive and thermoplastic polymer preform releasably retained in the chuck.

Presented in FIG. 1 is a fragmentary perspective view of a triple carrier assembly usable in conjunction with the chuck activating apparatus of this invention. The carrier assembly 22 for conveying thermoplastic polymer preforms 202 through the blow molding machine and steps of the blow molding process is supported on rail 42 by rollers 218 attached to carrier body 200 and moved by chains 32 connected to a drive means not shown. Extending from carrier body 200 is chuck 206, for releasably retaining preform 202, having slidably mounted thereon release ring 220 for actuating a gripper, not shown, in the chuck 206 to releasably retain preform 202. Projecting through the carrier body 200 on the side opposite to chuck 206 is a hollow shaft which is connected to chuck 206 and has mounted thereon sprocket 210. Sprocket 210 is rotated by means of a chain, not shown, which causes the shaft and hence chuck 206 to rotate. The carrier assembly 22 of FIG. 1 is, without the preforms 202, positioned adjacent the chuck activating apparatus of this invention, whereupon the chuck 206 is engaged and release ring 220 is activated by the apparatus of this invention to cause chuck 206 to receive preform 202. Upon inserting the preform 202 into chuck 206 the apparatus of this invention disengages from chuck 206 causing chuck 206 to releasably retain preform 202 whereupon the carrier assembly 22 moves to the next position in the blow molding machine for the next step of the blow molding process.

Turning to FIG. 2, a top plan view is shown of a chuck activating apparatus 300 according to this invention wherein the slide member 302 is in the forward chuck engaging position over release ring 220. As shown in FIG. 2 the chuck activating apparatus has frame 301 with two side members 317. Movably mounted in frame 301 is slide 302 having arm 316, containing slot 307, and a forked end 303 with tines or fingers 304. Forked end 303 is mounted to arm 316 with bolts 313. Attached to arm 316 are rollers 305 and 305A which ride in a horizontal slot in each of sides 317. Guide rollers 306 riding in slot 307 of arm 316 and fixed to the bottom of frame 301 are used to prevent sideward motion of slide 302 during its travel. Hydraulic cylinder 308 which imparts motion to slide 302 is mounted to sides 317 of frame 301 by trunions 309 and has the piston rod 407 of the cylinder attached to the clevis 310 of slide 302 by connector 311 and pin 312. Proximity switches 314 and 315 respectively sense and indicate the forward and rear positions of slide 302. These switches are safety devices and do not form a part of this invention.

Referring to FIG. 3 there is shown in an apparatus according to this invention the slide 302 in its forward chuck activating position depressing release ring 220 which in turn has depressed tabs 405 in chuck 206 thereby activating chuck 206 to receive and releasably retain preform 401. Release ring 220 is also shown, in phantom, in the location for contacting but not depressing tabs 405 when slide 302 is disengaged from chuck 206. In the position shown in FIG. 3 piston rod 407 of hydraulic cylinder 308 is retracted into the cylinder, rear roller 305A is located against the surface of the recess 404 in the upper surface of slot 403 and front roller 305 is against the forward end of slot 403 inside 317 of frame 301 thereby causing the forked end 303 of slide 302 to exhibit a downward motion depressing release ring 220. Rollers 305 and 305A in conjunction with slot 403 determine the amount of forward and rearward movement of slide 302.

In FIG. 4 there is shown a chuck activating apparatus according to this invention wherein slide 302 is in the rear chuck disengaged position. Further, there is shown in FIG. 4, in conjunction with the environment of this invention, partial sections of chuck 206 and preform 401 with the preform 401 releasably retained in chuck 206 by spring loaded movable grippers 501 mounted on pins 502. When slide 302 is in the rear chuck disengaged position it is horizontal, piston rod 407 of hydraulic cylinder 308 is extended and rear roller 305A is dislocated from recess 404 and rests against the rear end of slot 403.

Referring now to FIGS. 3 and 4 the operation of a chuck activating apparatus according to a preferred embodiment of this invention may be described as follows. Starting with slide 302 in the rearward position as shown in FIG. 4 the piston rod 407 of hydraulic cylinder 308 is extended, rear roller 305A is displaced from notch 404 in slot 403 of side 317 of frame 301 and rest against the rear of slot 403, release ring 220 of chuck 206 rests on tabs 405 of the spring loaded movable grippers 501 mounted on pins 502, grippers 501 are in their forward preform grasping position. Hydraulic fluid is fed to hydraulic cylinder 308 to retract piston rod 407 attached to arm 316 of slide 302 by connector 311. The retraction of piston rod 407 thereby advances slide 302 forward until front roller 305 is pressed against the front of slot 403 stopping the forward travel of side 302, rear roller 305A is under notch 404, forked end 303 is brought forward so that tines or fingers 304 are over release ring 220. A further slight retraction of piston rod 407 puts an upward force on the rear end of arm 316 of slide 302 causing slide 302 to pivot about front roller 305 bringing rear roller 305A into notch 404, thereby stopping further pivoting of slide 302, and moving fingers 304 of forked end 303 into contact with and depressing release ring 220 as shown in FIG. 3. As release ring 220 is depressed it presses against tabs 405 causing grippers 501 to rotate about pins 502 into a retracted position. Chuck 206 is now activated to receive preform 401. Upon inserting preform 401 into activated chuck 206 with slide 302 in its forward position and piston rod 407 retracted as shown in FIG. 3 the flow of hydraulic fluid to the hydraulic cylinder 308 is reversed thereby extending piston rod 407 and initially causing downward force on the rear end of arm 316 to pivot slide 302 about front roller 305, displace rear roller 305A from notch 404, lift fingers 304 from release ring 220 allowing release ring 220 to rise thereby permitting spring loaded grippers 501 to pivot about pins 502 into their forward preform grasping position. Continued extension of piston rod 407 occurs causing slide 302 to move in a rearward direction pressing rear roller 305A against the rear end of slot 403 thereby stopping the rearward movement of slide 302 and disengaging forked end 303 from chuck 206.

Surprisingly this invention advantageously provides a fast acting, positive, reliable and durable apparatus for activating a chuck, having a gripper assembly and a release ring slideably mounted on the exterior surface of the chuck to engage the gripper assembly, to receive and releasably retain a thermoplastic polymer preform in a machine for blow molding a thermoplastic polymer container (e.g. bottle).

Although this invention has been described with reference to FIGS. 1 to 4 such description is not intended to be limiting on the invention. Thus, there is provided in accordance with one embodiment of this invention in a machine for blow molding a thermoplastic polymer container, having a chuck for receiving and releasably retaining a thermoplastic polymer preform the chuck comprising a housing, a gripper assembly attached to the housing for releasably grasping the preform and a release ring slidably mounted on the exterior of the housing for engaging the gripper assembly, an apparatus for activating the chuck to receive and releasably retain the preform comprising (a) a frame for movably supporting, (b) a slide having a forked end for engaging the release ring of the chuck, (c) a means for reversably moving the slide, (d) limiting means for controlling the travel of the slide in a horizontal direction in the frame, (e) pivoting means for causing pivoting of the slide at its forward limit of travel and (f) means for producing substantially vertical movement of the forked end for operating the release ring.

In a particular embodiment of this invention the forked end of the slide may have a plurality of openings for engaging and activating a plurality of chucks for gripping and releasably retaining thermoplastic polymer preforms. According to another particular embodiment of this invention the forked end of the slide may have a single opening for engaging and activating a single chuck. In a further embodiment of this invention there may be employed a hydraulic cylinder as a means for reversably moving the slide. Alternatively a pneumatic cylinder may be used to move the slide. Although one means for imparting substantially vertical motion to the forked end of the slide has been shown in FIGS. 3 and 4 other means for imparting such vertical motion to the forked end of the slide may be used. Thus, for example, instead of a notch 404 on the upper surface of slot 403 there may be used a rearward tapering surface on the bottom of slot 403 of FIGS. 3 and 4 at a point substantially the same location as notch 404 along the length of slot 403. Such a raised surface would cause rear roller 305 to rise as slide 302 moves forward at the point of the raised surface thereby rotating slide 302 about front roller 305 to impart a substantially vertical movement of forked end 303. Other means for producing substantially vertical movement of the forked end of the slide will be recognized by those skilled in the art. The slide of the apparatus according to this invention may have any of a number of configurations other than the flat two piece configuration of slide 302 in FIGS. 2, 3, and 4. For example, the slide may have a flat single piece configuration, Various other modifications and variations on the apparatus of this invention will be known to those skilled in the art without departing from the spirit and scope of the invention as set forth in the following claims.

What is claimed is:

1. In a machine for blow molding a thermoplastic polymer container, said machine having a chuck for receiving and releasably retaining a thermoplastic polymer preform, the chuck comprising a housing, a gripper assembly attached to the housing for releasably grasping the preform and a release ring slidably mounted on the exterior of the housing for engaging the gripper assembly, an apparatus for activating the chuck to receive and releasably retain the preform comprising (a) a frame, (b) a slide having a forked end for engaging the release ring of the chuck movably supported on the frame for horizontal movement between a forward chuck engaging position and a rearward chuck disengaging position, (c) a means for reversably moving the slide, (d) limiting means for controlling the travel of the slide in a horizontal direction in the frame, (e) pivoting means for causing pivoting of the slide at its forward limit of travel and (f) means for producing substantially vertical movement of the forked end for engaging the release ring.

2. The apparatus according to claim 1 wherein the slide has a forked end having a plurality of openings.

3. The apparatus according to claim 1 wherein the slide has a forked end having a single opening.

4. The apparatus according to claim 2 wherein the means for reversably moving the slide comprises a hydraulic cylinder.

5. The apparatus according to claim 3 wherein the means for reversably moving the slide comprises a hydraulic cylinder.

* * * * *